(12) United States Patent
Yamada et al.

(10) Patent No.: US 12,080,910 B2
(45) Date of Patent: Sep. 3, 2024

(54) WIRING MATERIAL AND BATTERY MODULE

(71) Applicant: NIPPON MEKTRON, LTD., Tokyo (JP)

(72) Inventors: Shuzo Yamada, Tokyo (JP); Tsukasa Watanabe, Tokyo (JP); Shunsuke Tomita, Tokyo (JP); Tomoki Kanayama, Tokyo (JP)

(73) Assignee: NIPPON MEKTRON, LTD., Tokyo (JP)

( * ) Notice: Subject to any disclaimer, the term of this patent is extended or adjusted under 35 U.S.C. 154(b) by 641 days.

(21) Appl. No.: 17/299,881

(22) PCT Filed: Mar. 18, 2020

(86) PCT No.: PCT/JP2020/011869
§ 371 (c)(1),
(2) Date: Jun. 4, 2021

(87) PCT Pub. No.: WO2020/246111
PCT Pub. Date: Dec. 10, 2020

(65) Prior Publication Data
US 2022/0077536 A1 Mar. 10, 2022

(30) Foreign Application Priority Data

Jun. 7, 2019 (JP) .................. 2019-107124

(51) Int. Cl.
*H01M 50/298* (2021.01)
*H01M 50/284* (2021.01)
(Continued)

(52) U.S. Cl.
CPC ....... *H01M 50/298* (2021.01); *H01M 50/284* (2021.01); *H01M 50/505* (2021.01); *H01M 50/519* (2021.01)

(58) Field of Classification Search
CPC .. H01M 10/48; H01M 50/204; H01M 50/284; H01M 50/298; H01M 50/505;
(Continued)

(56) References Cited

U.S. PATENT DOCUMENTS 10,297,808 B2   5/2019   Saito et al.
2012/0231638 A1  9/2012   Keda et al.
(Continued)

FOREIGN PATENT DOCUMENTS

CN   206211098 U   5/2017
CN   107534121 A   1/2018
(Continued)

OTHER PUBLICATIONS

Office Action mailed by China National Intellectual Property Administration on Dec. 27, 2023, which corresponds to Chinese Patent Application No. 202080006751.8 and is related to U.S. Appl. No. 17/299,881; with English language translation.
(Continued)

*Primary Examiner* — Victoria H Lynch
(74) *Attorney, Agent, or Firm* — Studebaker & Brackett PC

(57) ABSTRACT

Provided is a wiring material which is advantageous for space saving while ensuring seismic resistance of a flexible circuit board. A wiring material 7 including a flexible circuit board 10 in which a plurality of batteries 3A to 3L arranged in one direction is connected to one another via a bus bar 20 and an arrangement direction of the batteries 3A to 3L is a longitudinal direction of the flexible circuit board 10, includes: a narrow connecting portion 18 connected to the bus bar 20; and a main body 68 that is connected to the connecting portion 18 and includes a portion wider than the connecting portion 18. The connecting portion 18 is configured to have a longitudinal extending portion 18a that
(Continued)

projects from the main body 68 in the longitudinal direction and extends in the longitudinal direction.

8 Claims, 13 Drawing Sheets

(51) Int. Cl.
*H01M 50/505* (2021.01)
*H01M 50/519* (2021.01)

(58) Field of Classification Search
CPC ............. H01M 50/507; H01M 50/519; H01M 50/569; Y02E 60/10
See application file for complete search history.

(56) References Cited

U.S. PATENT DOCUMENTS

| | | |
|---|---|---|
| 2018/0019451 A1 | 1/2018 | Zhao et al. |
| 2018/0130989 A1 | 5/2018 | Saito et al. |
| 2019/0027731 A1 | 1/2019 | Zeng et al. |
| 2019/0181418 A1 | 6/2019 | Son et al. |
| 2020/0020917 A1 | 1/2020 | Ichikawa et al. |
| 2022/0013868 A1 | 1/2022 | Takahashi et al. |

FOREIGN PATENT DOCUMENTS

| | | |
|---|---|---|
| CN | 108155506 A | 6/2018 |
| CN | 112997354 A | 6/2021 |
| JP | 2011-228216 A | 11/2011 |
| JP | 2013-054940 A | 3/2013 |
| JP | 2013-080621 A | 5/2013 |
| JP | 2013-098032 A | 5/2013 |
| JP | 2017-033646 A | 2/2017 |
| JP | 2019-023996 A | 2/2019 |
| JP | 2020-013765 A | 1/2020 |
| JP | 2020-087665 A | 6/2020 |

OTHER PUBLICATIONS

International Search Report issued in PCT/JP2020/011869; mailed Jun. 9, 2020.

An Office Action; "Notice of Reasons for Refusal," mailed by the Japanese Patent Office on Jun. 27, 2023, which corresponds to Japanese Patent Application No. 2019-107124 and is related to U.S. Appl. No. 17/299,881; with English language translation.

An Office Action mailed by China National Intellectual Property Administration on Jun. 15, 2024, which corresponds to Chinese Patent Application No. 202080006751.8 and is related to U.S. Appl. No. 17/299,881; with English language translation.

(a)

(b)

(a)

(b)

WIRING MATERIAL AND BATTERY MODULE

TECHNICAL FIELD

The present invention relates to a wiring material and a battery module.

BACKGROUND ART

There is a battery module in which a plurality of batteries is accommodated in a case body. In the battery module, the battery and a conductive terminal (bus bar) are electrically connected by wiring inside the case body, and the battery voltage is monitored. Further, in the battery module, in order to prevent an abnormality in the electrical connection between the batteries due to disconnection, twisting or the like of the wiring connecting the batteries when vibration is applied to the battery module, a flexible circuit board having flexibility is used as a wiring circuit board. At this time, in order to impart seismic resistance to the wiring, the flexible circuit board is designed to bend due to the vibration with a margin in length of a portion under the wiring connected to the battery. The battery module having such a configuration is described in, for example, PATENT LITERATURE 1 and PATENT LITERATURE 2.

CITATION LIST

Patent Literature

PATENT LITERATURE 1: JP-A-2011-228216
PATENT LITERATURE 2: JP-A-2019-023996

SUMMARY OF INVENTION

Problems to be Solved by Invention

However, the battery module is preferably small in size because of an arrangement space and the like. Although the case body has dimensions and shape required to accommodate the batteries, routing of the wiring and design of the flexible circuit board under the wiring are limited. In the above PATENT LITERATURE 1 and PATENT LITERATURE 2, a portion (connecting portion) of the flexible circuit board connected to the bus bar projects from a main body of the flexible circuit board in a width direction thereof. Therefore, in order to obtain a flexible connecting portion, a size of the case body increases in the width direction. Therefore, these are disadvantageous in miniaturization of the battery module.

The present invention has been made in view of such a point. The present invention relates to the wiring material and the battery module, which are advantageous for space saving while ensuring the seismic resistance of the flexible circuit board.

Solution to Problems

A wiring material according to an aspect of the present invention includes a flexible circuit board in which a plurality of batteries arranged in one direction is connected to one another via a bus bar and an arrangement direction of the batteries is a longitudinal direction of the flexible circuit board, the wiring material including: a narrow connecting portion connected to the bus bar; and a main body that is connected to the connecting portion and includes a portion wider than the connecting portion. The connecting portion has a longitudinal extending portion that projects from the main body in the longitudinal direction and extends in the longitudinal direction.

A battery module according to an aspect of the present invention includes a wiring material including a flexible circuit board in which a plurality of batteries arranged in one direction is connected to one another via a bus bar and an arrangement direction of the batteries is a longitudinal direction of the flexible circuit board, in which the wiring material includes: a narrow connecting portion connected to the bus bar; and a main body that is connected to the connecting portion and includes a portion wider than the connecting portion, and the connecting portion has a longitudinal extending portion that projects from the main body in the longitudinal direction and extends in the longitudinal direction, and the bus bar has a terminal engaging portion that engages with a terminal of the battery and a projecting end portion that extends from the terminal engaging portion toward the longitudinal extending portion.

Effects of Invention

The present invention can provide the wiring material and the battery module, which are advantageous for space saving while ensuring the seismic resistance of the flexible circuit board.

DESCRIPTION OF EMBODIMENTS

Figure 1:
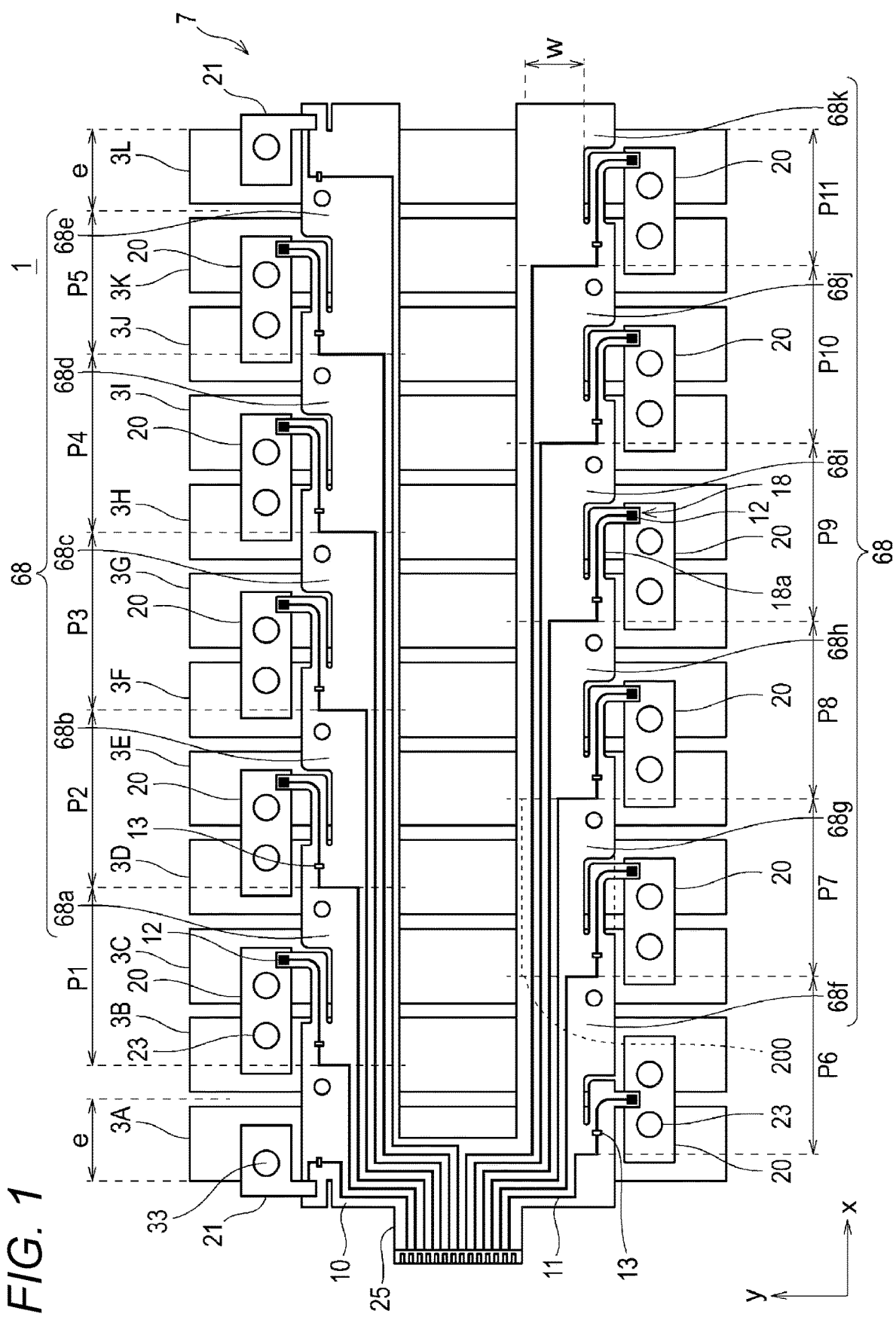
FIG. 1 is a diagram illustrating a top view of a battery module of a first embodiment of the present invention.

A wiring material and a battery module according to first to fourth embodiments of the present invention will be described below. In the present embodiment, the same members are denoted by the same reference numerals. Further, drawings of this embodiment exemplify configuration of the present invention and a positional relationship and shapes of members, do not limit specific configuration thereof, and do not always accurately illustrate dimensional shape and aspect ratio.

Overview

Figure 2:
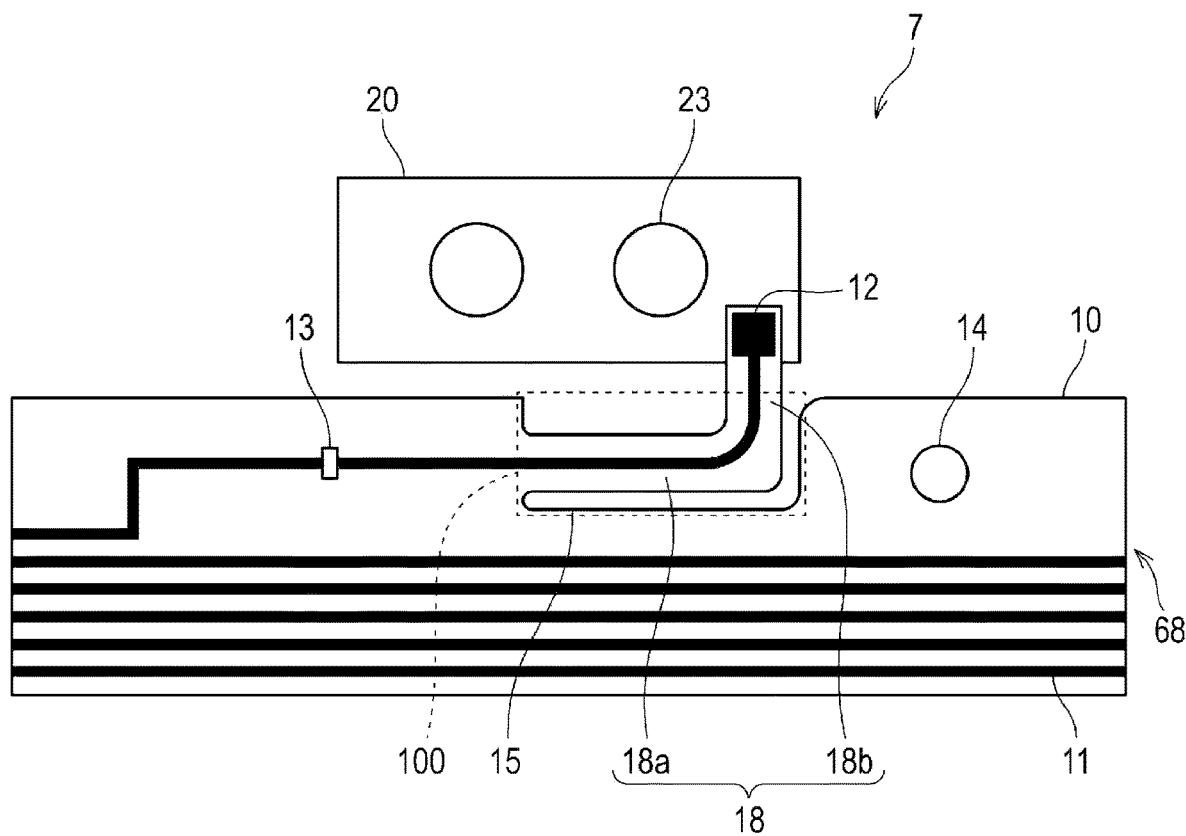
FIG. 2 is a diagram for explaining a main part of a wiring material illustrated in FIG. 1.

FIGS. 1 and 2 are diagrams for explaining a battery module 1 and a wiring material 7 of a first embodiment. FIG. 1 is a diagram illustrating a top view of the battery module 1 of the first embodiment. FIG. 2 is a diagram for explaining a main part of the wiring material 7 illustrated in FIG. 1.

The battery module 1 is configured such that a plurality of batteries 3A to 3L is connected to one another by the wiring material 7. The wiring material 7 includes a flexible circuit board 10 and wiring 11 formed on the flexible circuit board 10. Bus bars 20 are mechanically and electrically connected to terminals 33 of the batteries 3A to 3L. The wiring 11 is connected to the bus bar 20 and further connected to a connector 25. The batteries 3A to 3L are arranged side by side in a linear direction. Voltage values (signals) obtained from the terminals 33 are input from the connector 25 to a circuit (not shown) formed on a circuit board (not shown). The circuit constitutes, for example, detection of the voltage values from the batteries 3A to 3L, a temperature sensor, or the like. The battery module 1 illustrated in FIG. 1 is configured to be elongated in an x direction, and the batteries 3A to 3L are arranged side by side in the x direction in the drawing. In other words, in the flexible circuit board 10, the x direction is a longitudinal direction.

The battery module 1 illustrated in FIG. 1 is accommodated in a case body (not shown) and used. Inside the case body, the wiring material 7 has a portion that absorbs vibration and bends in order to prevent breakage due to the vibration being applied thereto. It is known that the longer the bent portion is, the higher the vibration absorbing effect is. However, a space inside the case body is limited. The bent portion is required to have two contradictory points of space saving and vibration absorption.

In each of the first to fourth embodiments of the present invention, as illustrated in FIG. 2, a cutout portion 100 is formed in the flexible circuit board 10. A longitudinal extending portion 18a that acts as a bent portion of a connecting portion 18 is disposed in the cutout portion 100.

Further, in each of the first to fourth embodiments, the longitudinal extending portion 18a extends in a longitudinal direction of the flexible circuit board 10, and a portion of the flexible circuit board 10 projecting in a width direction thereof is reduced as much as possible.

In this way, the longitudinal extending portion 18a can be disposed in an arrangement space of the wiring material 7. Therefore, it is possible to increase a length of the longitudinal extending portion 18a to such an extent that sufficient seismic resistance can be ensured without separately providing an arrangement space of the longitudinal extending portion 18a.

First Embodiment

Hereinafter, the battery module 1 and the wiring material 7 of the first embodiment will be described in detail.
(Battery Module)

As illustrated in FIG. 1, the battery module 1 includes: the wiring material 7 including the flexible circuit board 10 in which the batteries (batteries 3A to 3L) arranged in one direction are connected to one another via the bus bars 20 and an arrangement direction of the batteries 3A to 3L is the longitudinal direction; and the bus bars 20 connected to the wiring material 7. A hole 23 formed in the bus bar 20 is an insertion hole through which a screw for fixing the battery 3A or the like is inserted. In the wiring material 7, the flexible circuit board 10 connected to at least some of the batteries 3A to 3L includes: a narrow connecting portion 18 connected to the bus bar 20; and a main body 68 connected to the connecting portion 18 and including a portion wider than the connecting portion 18. Then, as illustrated in FIG. 2, the connecting portion 18 has the longitudinal extending portion 18a that projects in the longitudinal direction from the main body 68 and extends in the longitudinal direction.

In the first embodiment, the flexible circuit board 10 has a plurality of the connecting portions 18. The flexible circuit board 10 has circuit board units P1 to P11 including at least one of the connecting portions 18 and at least one of main body portions 68a to 68k separated corresponding to the connecting portions 18. In other words, the main body portions 68a to 68k are each of the main body portions 68 separated to correspond to the connecting portions 18. Combination of the connecting portion 18 and the main body portion corresponding to the connecting portion 18 is a circuit board unit (any one of the circuit board units P1 to P11).

The wiring material 7 illustrated in FIG. 1 includes the circuit board units P1 to P11. In an example illustrated in FIG. 1, the main body portions 68a to 68k are formed by separating the main body 68 according to a pattern of the wiring 11 that bends toward a fuse 13. Each main body portion and one connecting portion 18 connected to the main body portion are included in one circuit board unit.

The longitudinal extending portion 18a projects from the corresponding main body portion of the circuit board unit. The main body portion of the circuit board unit corresponding to the longitudinal extending portion 18a means the main body portion included in the same circuit board unit as the longitudinal extending portion 18a. For example, the main body portion corresponding to the longitudinal extending portion 18a of the circuit board unit P3 is the main body portion 68c.

In the battery module 1 illustrated in FIG. 1, the batteries 3B to 3L are connected by the circuit board units P1 to P11. Portions of the flexible circuit board 10 for connecting the batteries, which are arranged at both ends of the batteries, may have an arbitrary shape so as to be suitable for terminating wiring or the like. In the example illustrated in FIG. 1, bus bars 21 at ends e of the wiring material 7 are directly connected to the batteries 3A and 3L.

In the above configuration, "narrow connecting portion" means that a length (width) of the connecting portion 18 in a direction perpendicular to an extending direction thereof is shorter than that of the main body 68. The main body 68 including a portion wider than the connecting portion 18 may be connected to a base end of the connecting portion 18 in the flexible circuit board 10 and may include a portion wider than the width of the connecting portion 18. Specifically, the main body 68 of the first embodiment refers to a portion having a width not less than a width W illustrated in FIG. 1.
(Wiring Material)

As illustrated in FIG. 2, the wiring material 7 includes a flexible circuit board 10. The flexible circuit board 10 that connects the batteries 3A to 3L includes the connecting portion 18 and the main body 68. Further, the connecting portion 18 has the longitudinal extending portion 18a. The longitudinal extending portion 18a projects and extends from the main body 68 in the longitudinal direction (x direction in FIG. 1) of the flexible circuit board 10. Since a slit 15 is formed between the connecting portion 18 and the main body 68, the connecting portion 18 can be freely displaced to be lifted, bent, or twisted without being restricted by the main body 68. In the present specification, such displacements are also collectively referred to as "bending".

The longitudinal extending portion 18a illustrated in FIG. 2 is disposed in a circumscribed virtual region 200 illustrated in FIG. 1. The circumscribed virtual region 200 is a virtual region that circumscribes each of the main body portions 68a to 68k of the flexible circuit board 10. The entire circumscribed virtual region 200 of the main body portions 68a to 68k is roughly equal to a space required for arranging the main body 68. From this point, it can be understood that in the first embodiment, it is not necessary to separately provide a space for arranging the longitudinal extending portion 18a.

Note that in FIG. 1, a part of dotted lines indicating the circumscribed virtual region 200 is illustrated slightly offset from an accurately circumscribed line in consideration of visibility.

Further, the connecting portion 18 has a cross-extending portion 18b. The cross-extending portion 18b extends from the longitudinal extending portion 18a in a direction intersecting the longitudinal direction. In the first embodiment, the length of the longitudinal extending portion 18a is made longer than that of the cross-extending portion 18b, and a space for arranging the wiring material 7 in the width direction in the connecting portion 18 is reduced while ensuring a portion that bends due to the vibration. In the first embodiment, the cross-extending portion 18b has a minimum length for being connected to the bus bar 20, and the bus bar 20 can be arranged close to the wiring material 7.

Further, the wiring 11 formed on the flexible circuit board 10 has the fuse 13 in the middle, and is prepared for an overcurrent to flow in the battery module 1. An electrode 12 is formed at an end of the wiring 11. In the first embodiment, the electrode 12 is connected to the bus bar 20 by a solder material. Therefore, a hole (not shown) is formed at an end of the cross-extending portion 18b that overlaps the bus bar 20. Through this hole, the wiring 11 and the bus bar 20 are mechanically and electrically connected to each other by the solder material. Further, the other end of the wiring 11 is connected to the connector 25 (FIG. 1). The flexible circuit board 10 is formed with an alignment hole 14 used when connecting the wiring material 7 to the battery.

However, the first embodiment is not limited to connecting the wiring 11 and the bus bar 20 by soldering. The wiring 11 may be connected to the bus bar 20 by laser welding, ultrasonic bonding, rivet connection, or the like in addition to soldering.

The flexible circuit board 10 is manufactured, for example, by forming the wiring 11 on a base film which is a thin film-like insulator. The wiring 11 is protected by an insulator sheet except for a terminal portion and a portion to be soldered. For the base film, a plastic resin such as polyimide or polyester (polyethylene naphthalate (PEN), liquid crystal polymer (LCP)) is used. Copper or copper foil is used for a conductor. Epoxy-based resin or acrylic resin is used as an adhesive. The bus bar 20 is made of a highly conductive material such as copper, brass, and aluminum.

According to the above configuration, in the first embodiment, the arrangement space of the wiring material 7 can be reduced. Further, the first embodiment is advantageous in increasing battery capacity by arranging the batteries 3A to 3L in a small space.

Further, in the flexible circuit board 10 provided with the portion extending from the main body 68, when the vibration is applied, the main body 68 may be cracked in an extending direction thereof. Therefore, for example, when the cross-extending portion 18b is directly connected to the main body 68, a crack may occur in a direction intersecting the wiring 11 and the wiring 11 may be disconnected. On the other hand, in the wiring material 7 of the first embodiment provided with the longitudinal extending portion 18a, even when the crack occurs in the x direction (FIG. 1) at the base end of the longitudinal extending portion 18a, the crack is difficult to intersect the wiring 11, and a range in which the wiring 11 is broken by the crack can be reduced.

Figure 3:
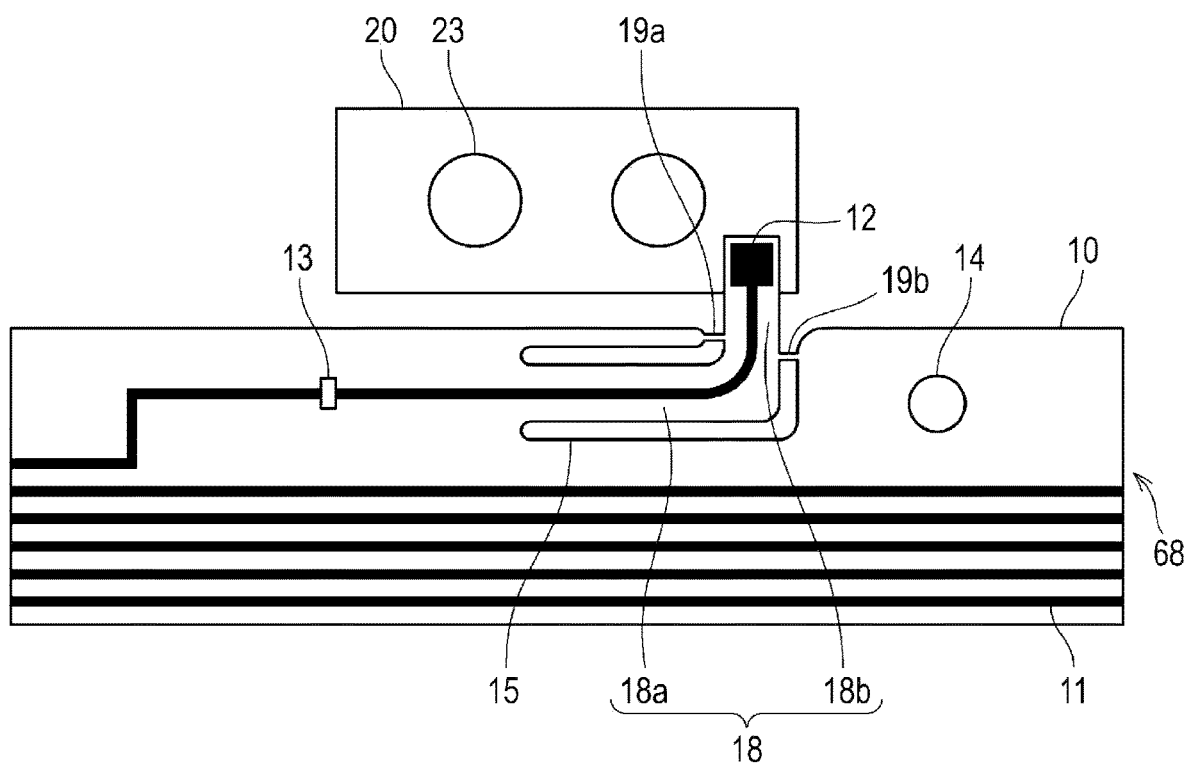
FIG. 3 is a diagram for explaining a modification of the first embodiment.

FIG. 3 is a diagram for explaining a modification of the first embodiment. The wiring material illustrated in FIG. 3 is obtained by further providing a joint portion 19a and a joint portion 19b in the wiring material 7 illustrated in FIG. 2. The joint portions 19a and 19b are members capable of breaking between the connecting portion 18 and the main body 68 with a force smaller than the force required to break the connecting portion 18.

"The force required to break the connecting portion 18" means a tensile load or a force required to break the member. In a tensile test, a breaking strength and a breaking load are similar. In the sheet-like flexible circuit board 10, the breaking strength is represented by a value (kgf/mm) obtained by dividing the force by a sheet width.

In the first embodiment, the joint portions 19a and 19b are both formed by the flexible circuit board 10 similar to the connecting portion 18. Therefore, by making the widths of the joint portions 19a and 19b narrower than the width of the connecting portions 18, the breaking strength of the joint portions 19a and 19b can be made lower than that of the connecting portions 18.

According to the above configuration, when attaching the wiring material to the battery module 1, since the connecting portion 18 is connected to the main body 68 by the joint portions 19a and 19b, a work of connecting the connecting portion 18 to the bus bar 20 is easy. Further, when a load is applied to the flexible circuit board 10 after the wiring material is attached, the joint portions 19a and 19b are broken prior to the connecting portion 18. When the joint portions 19a and 19b are broken, since the longitudinal extending portion 18a freely bends and absorbs the vibration, the connecting portion 18 is difficult to break. That is, the joint portions 19a and 19b illustrated in FIG. 3 can achieve both efficiency of work of attaching the wiring material and prevention of breakage after attaching the wiring material.

However, the joint portion of the first embodiment is not limited to the configuration illustrated in FIG. 3. For example, the joint portion is not limited to one having a constant width such as the joint portions 19a and 19b, and the width of the portion to be broken may be particularly narrowed. Further, the joint portion is not limited to one in which the width of the member similar to the connecting portion 18 is thinly processed, and the connecting portion 18 may be fixed to the main body 68 by a member having a breaking strength lower than that of the connecting portion 18.

Figure 4:
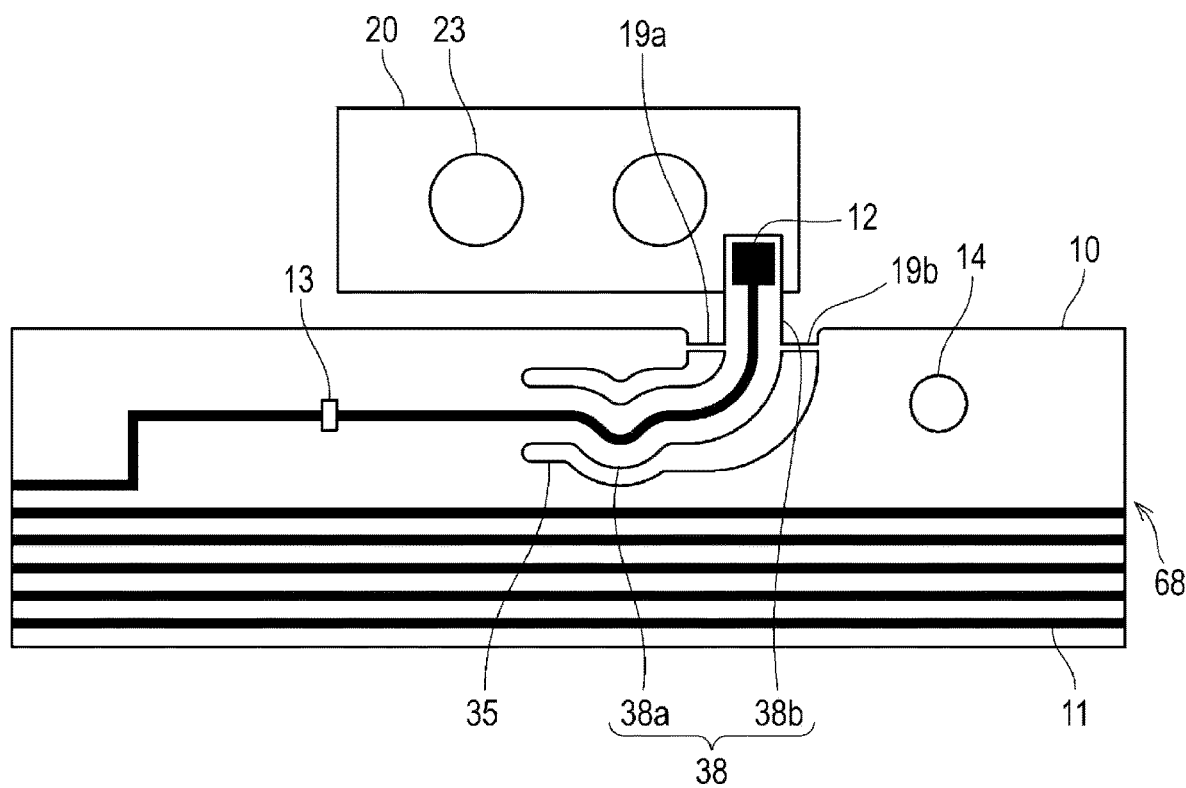
FIG. 4 is a diagram for explaining another modification of the wiring material of the first embodiment.

FIG. 4 is a diagram for explaining another modification of the wiring material of the first embodiment. In a connecting portion 38 illustrated in FIG. 4, a longitudinal extending portion 38a has a meander shape that extends in the longitudinal direction and has irregularities in the direction intersecting the longitudinal direction. The longitudinal extending portion 38a extends in the x direction of FIG. 1, and then bends relatively gently toward the bus bar 20 and extends in they direction of FIG. 1. In the first embodiment, a portion of the connecting portion 38 in the y direction is referred to as a cross-extending portion 38b, and a portion of the connecting portion 38 from the main body 68 to the cross-extending portion 38b is referred to as the longitudinal extending portion 38a.

Since the connecting portion 38 illustrated in FIG. 4 has a constant width, and an outer edge thereof is curved, the force acts unevenly as compared with the connecting portion 18 having a straight outer edge. Therefore, the connecting portion 38 is bent more easily than the connecting portion 18, and a high breakage prevention effect can be obtained. The wiring material illustrated in FIG. 4 includes the joint portions 19a and 19b, similarly to the wiring material illustrated in FIG. 3. When attaching the wiring material to the battery module 1, the longitudinal extending portion 38a is fixed to the main body 68. When the load is applied, the joint portions 19a and 19b are separated, and the longitudinal extending portion 38a is bent away from the main body 68 by a slit 35. Thus, the connecting portion 38 provided with the joint portions 19a and 19b can achieve both workability of assembly and prevention of breakage.

Second Embodiment

Figure 5:
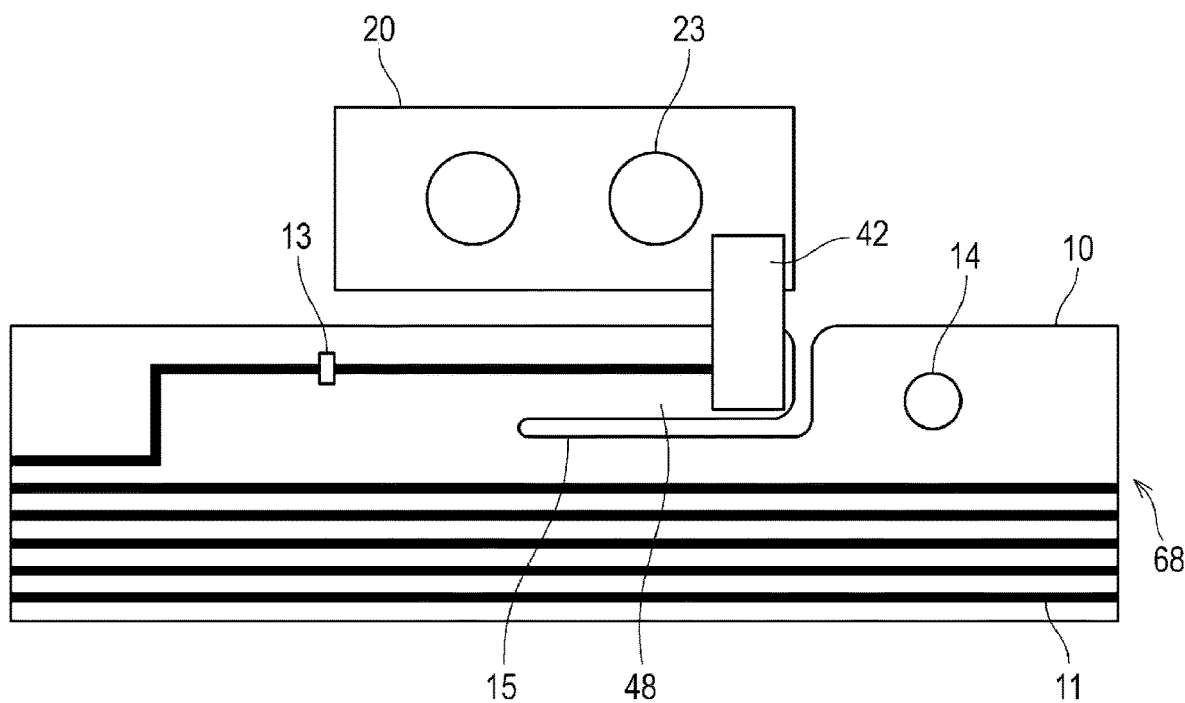
FIG. 5 is a diagram for explaining the wiring material of a second embodiment.
Figure 6:
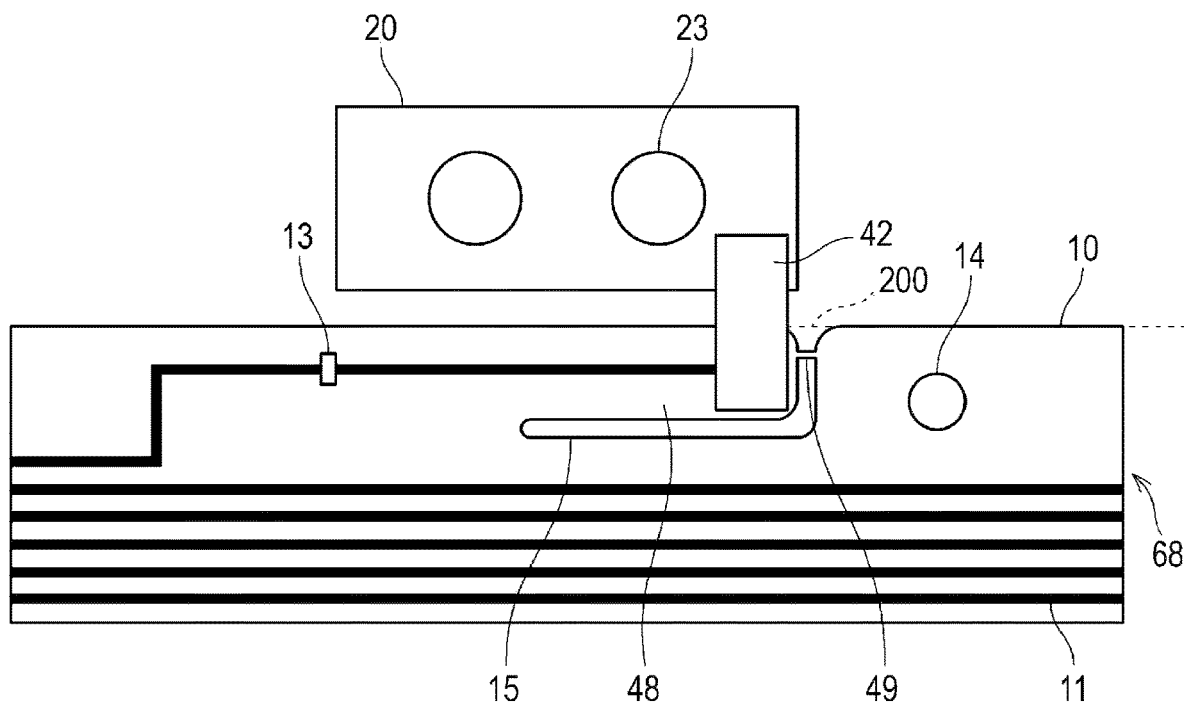
FIG. 6 is another diagram for explaining the wiring material of the second embodiment.

Next, the wiring material of the second embodiment will be described. FIGS. 5 and 6 are diagrams for explaining the wiring material of the second embodiment. The wiring material of the second embodiment is different from that of the first embodiment in that the cross-extending portion is formed by a conductive member different from the longitudinal extending portion, whereas both the longitudinal extending portion and the cross-extending portion are formed by the flexible circuit board 10 in the first embodiment. In an example of the second embodiment, the conductive member is a welding plate 42.

In the wiring material illustrated in FIG. 5, the wiring 11 is formed in a longitudinal extending portion 48, and the welding plate 42 electrically and mechanically connects the wiring 11 and the bus bar 20. A connection between the bus bar 20 and the welding plate 42 is made by welding. In the second embodiment, in which the cross-extending portion is a separate body from the longitudinal extending portion, the work of attaching the wiring material is easier than a case where the longitudinal extending portion 18a and the cross-extending portion 18b form an integral connecting portion 18.

FIG. 6 illustrates the wiring material provided with a joint portion 49 having a breaking strength lower than that of the longitudinal extending portion 48 in the second embodiment. In the second embodiment, in which the cross-extending portion is a separate welding plate 42, the joint portion 49 connects the longitudinal extending portion 48 and the main body 68. According to such a configuration, when the wiring material is attached, since the longitudinal extending portion 48 is fixed to the main body 68, the work is easy. When the load is applied, the joint portion 49 is broken and the longitudinal extending portion 48 can be bent.

Further, the longitudinal extending portion 48 illustrated in FIGS. 5 and 6 is provided inside the circumscribed virtual region 200 including the main body portion, similarly to the connecting portion 18 of the first embodiment. At this time, in the longitudinal extending portion 48 of the second embodiment illustrated in FIGS. 5 and 6, an outer edge on a side of the bus bar 20 coincides with an outer edge of the circumscribed virtual region 200, and the slit 15 is formed between a part of a periphery of the longitudinal extending portion 48 and the main body 68. However, the second embodiment is not limited to such a configuration. The longitudinal extending portion 48 may be provided further inside the circumscribed virtual region 200.

Figure 7:
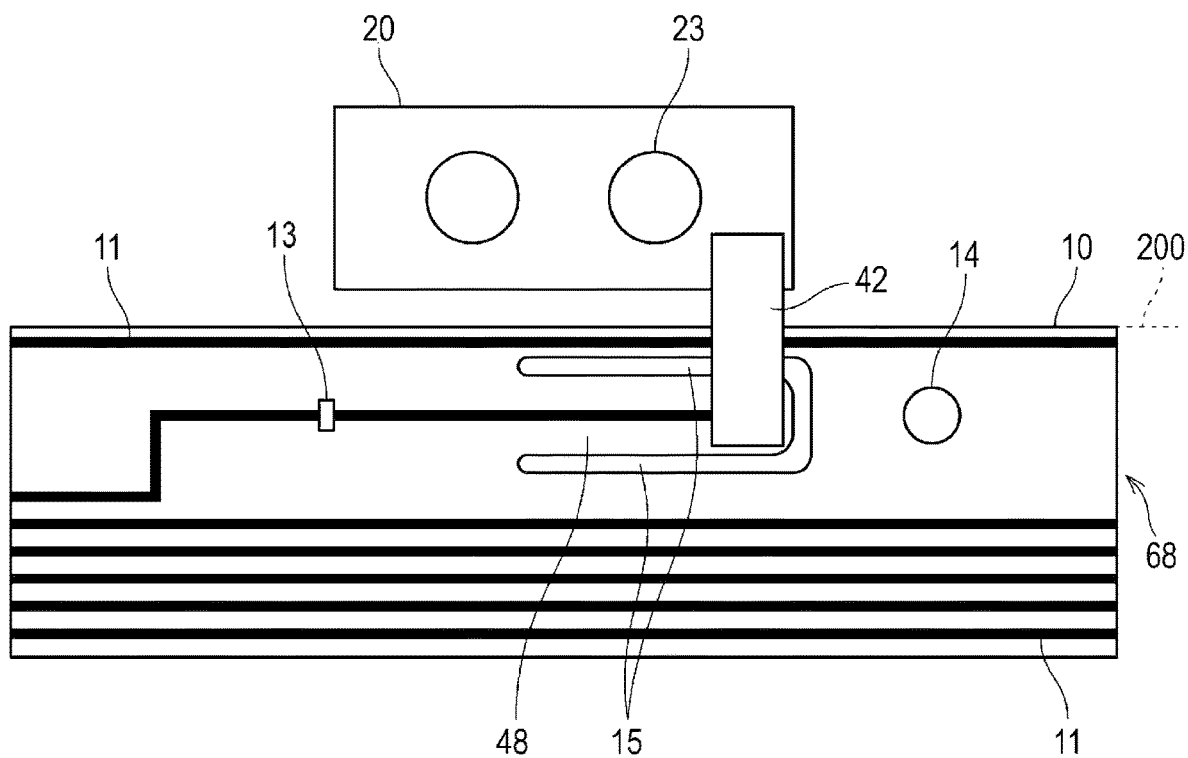
FIG. 7 is a diagram illustrating a modification of the second embodiment, that is, an example of the wiring material in which an outer peripheral edge of a longitudinal extending portion is disposed inside an outer edge of a virtual plane.

FIG. 7 is a diagram illustrating a modification of the second embodiment, that is, an example of the wiring material in which the longitudinal extending portion 48 is disposed to be included in the circumscribed virtual region 200. In the wiring material illustrated in FIG. 7, the slit 15 is formed on an entire circumference of the longitudinal extending portion 48. The main body 68 in which the wiring 11 is formed is disposed between the longitudinal extending portion 48 and the bus bar 20. The wiring material illustrated in FIG. 7 can increase a degree of freedom in routing the wiring 11 as compared with the wiring material illustrated in FIGS. 5 and 6. This facilitates design and layout of the wiring 11.

Figure 8:
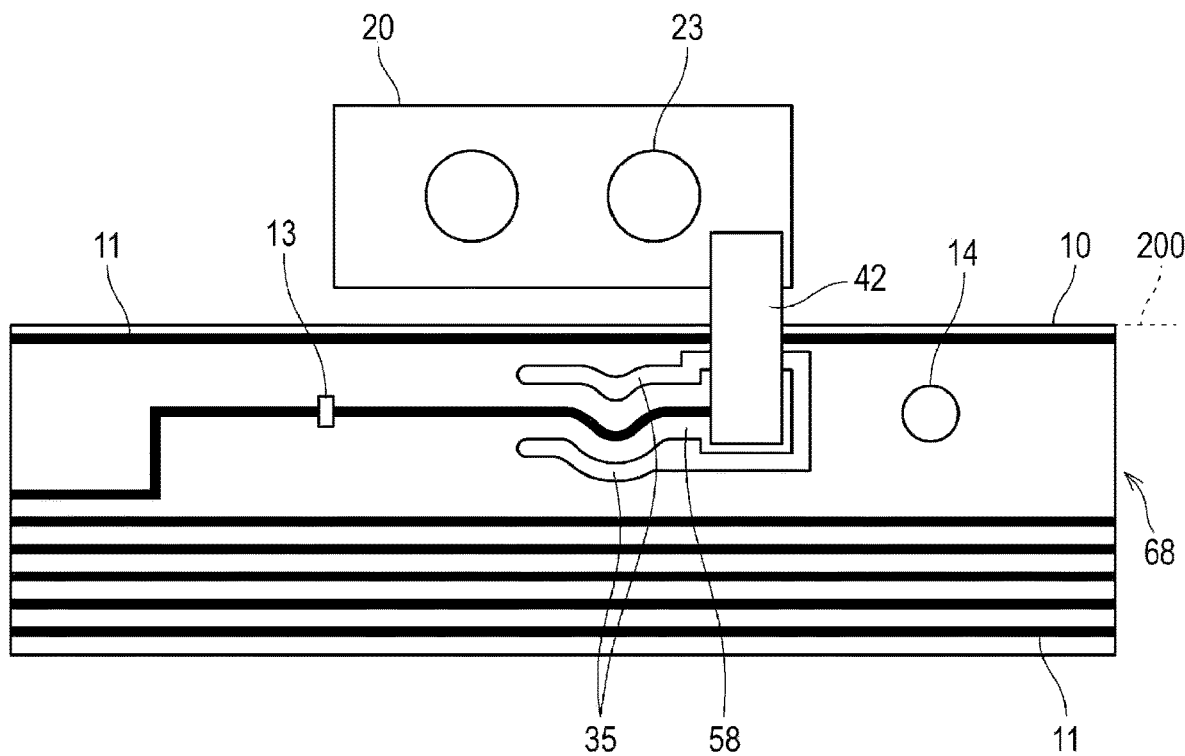
FIG. 8 is a diagram illustrating another modification of the second embodiment, that is, an example of the wiring material in which a longitudinal extending portion having a meander shape is formed inside the outer edge of the virtual plane.

FIG. 8 is a diagram illustrating an example in which a longitudinal extending portion 58 having a meander shape is formed to be included in the circumscribed virtual region 200. Also in the wiring material illustrated in FIG. 8, the slit 35 is formed on the entire circumference of the longitudinal extending portion 58. Then, the main body 68 is disposed between the longitudinal extending portion 58 and the bus bar 20, and the wiring 11 can be formed in the main body 68 between the longitudinal extending portion 58 and the bus bar 20.

Further, as illustrated in FIGS. 7 and 8, in the wiring material in which the slit 35 is formed on the entire circumference of the longitudinal extending portion, the crack in the longitudinal direction from the slit 35 is more likely to occur as compared with the wiring material in which the slit 35 is formed on only one side of the longitudinal extending portion.

Figure 9:
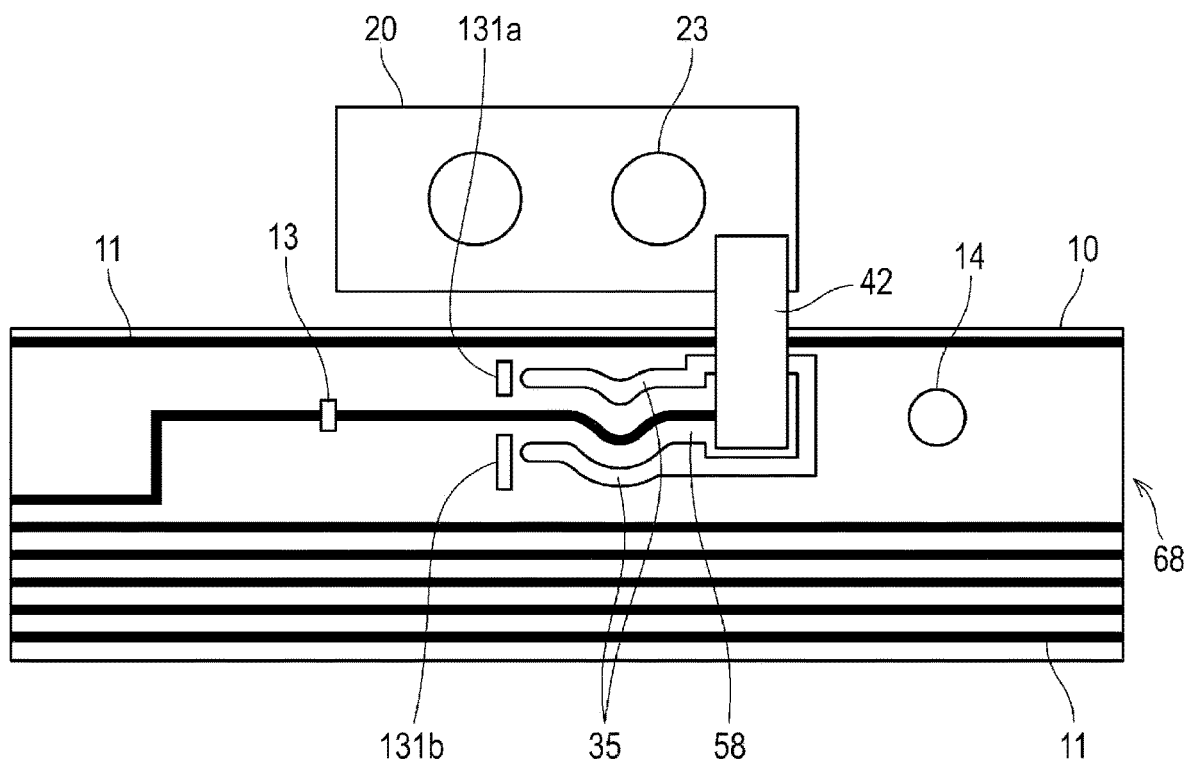
FIG. 9 is a diagram illustrating another modification of the second embodiment, that is, an example of the wiring material provided with a member for preventing a crack.

FIG. 9 illustrates an example in which a member for preventing the crack is provided in consideration of the above point. The wiring material illustrated in FIG. 9 includes a dummy pattern 131a and a dummy pattern 131b in the vicinity of the slit 35. In the second embodiment, in forming the dummy patterns 131a and 131b, in a step of forming the wiring 11, the dummy patterns 131a and 131b can be formed at the same time with the same material as the wiring 11.

Third Embodiment

Figure 10:
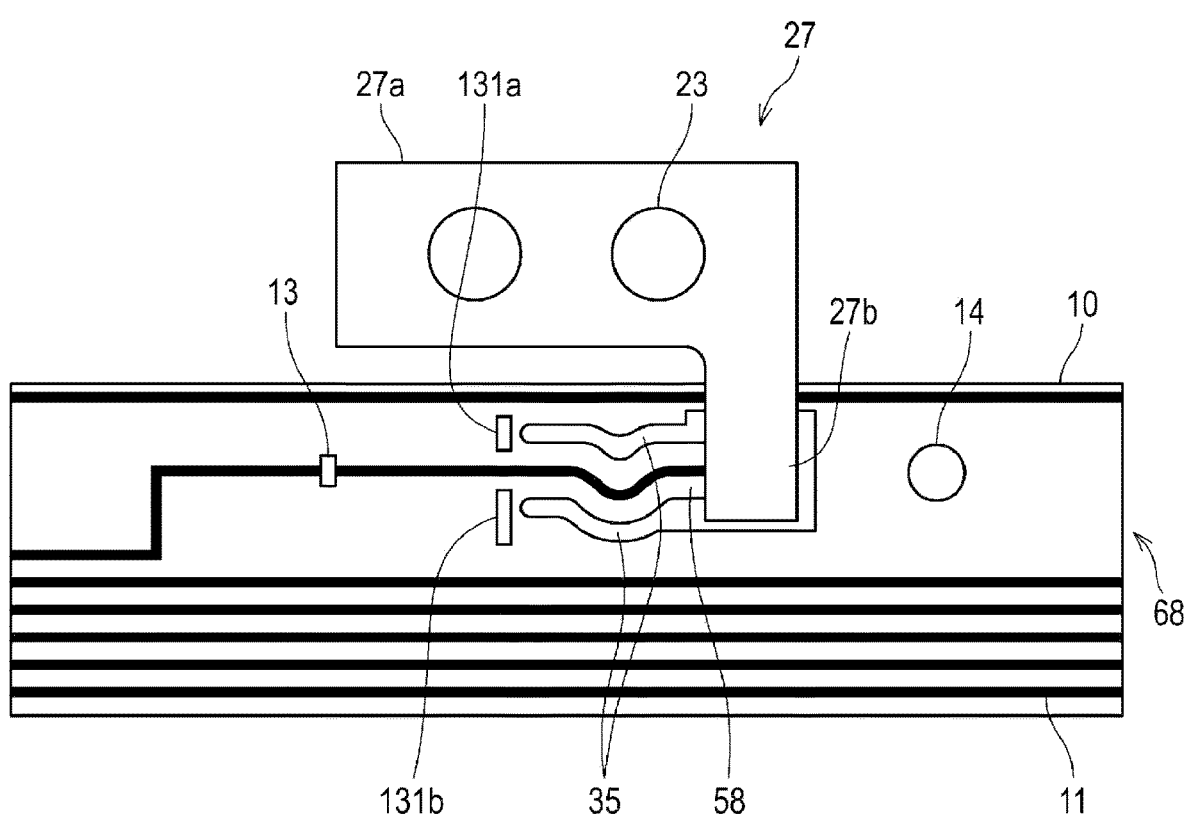
FIG. 10 is a diagram for explaining a main part of the battery module of a third embodiment.

Next, the battery module of the third embodiment will be described. FIG. 10 is a diagram for explaining a main part of the battery module of the third embodiment. As illustrated in FIG. 10, a bus bar 27 has a terminal engaging portion 27a that engages with the terminals of the batteries 3A to 3L. The terminal engaging portion 27a is a plate-like metal member having substantially the same configuration as the bus bar 20 of the first embodiment and the second embodiment and having a hole 23. Further, the bus bar 27 has a projecting end portion 27b extending from the terminal engaging portion 27a toward the longitudinal extending portion 58. The projecting end portion 27b overlaps the electrode 12 and is electrically conductive with the wiring 11.

Figure 11:
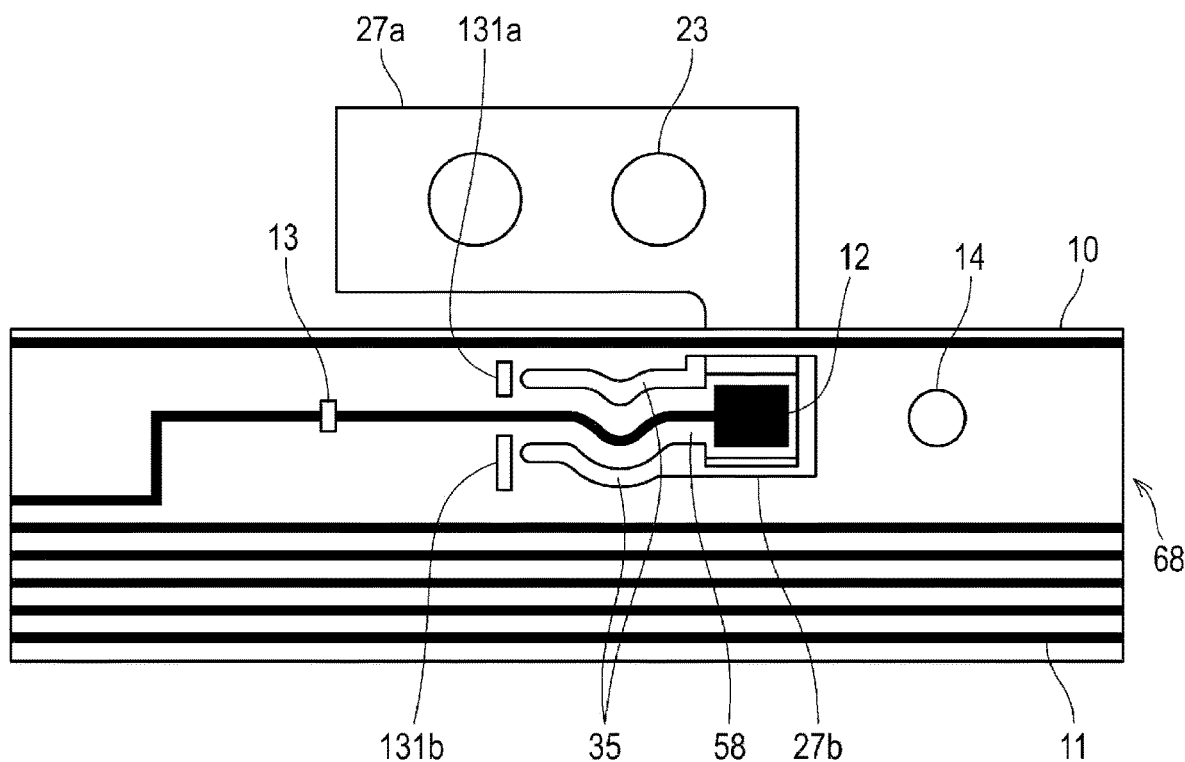
FIG. 11 is a diagram for explaining a modification of the battery module of FIG. 10.

FIG. 11 is a diagram for explaining a modification of the battery module of FIG. 10. The battery module illustrated in FIG. 11 is different from the configuration illustrated in FIG. 10 in that the projecting end portion 27b is disposed below the longitudinal extending portion 58. The projecting end portion 27b is formed of an insulating flexible circuit board 10. Therefore, a hole (not shown) is formed in a portion of the base film of the flexible circuit board 10 below the electrode 12 in the projecting end portion 27b. The electrode 12 conducts with the projecting end portion 27b through this hole.

Fourth Embodiment

Figure 12:
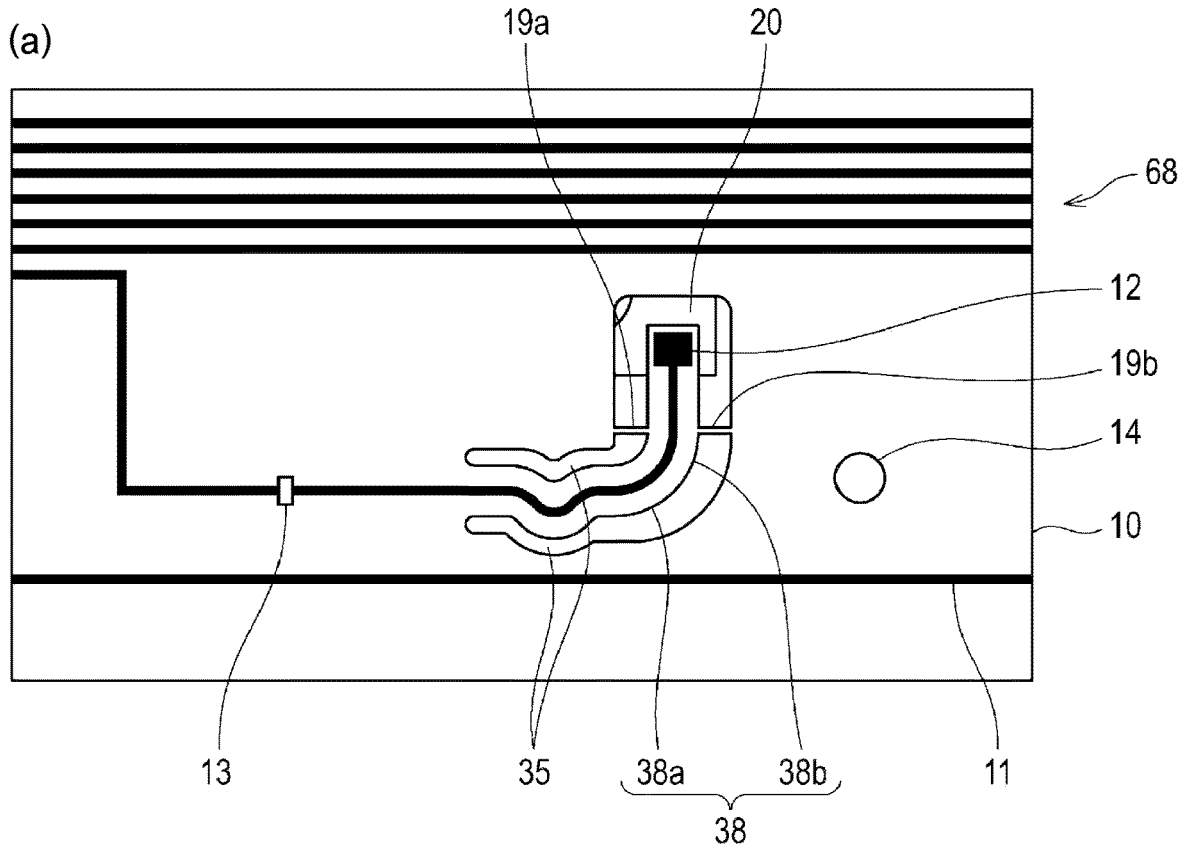
FIGS. 12(a) and 12(b) are both diagrams for explaining a main part of the battery module of a fourth embodiment.
Figure 12:
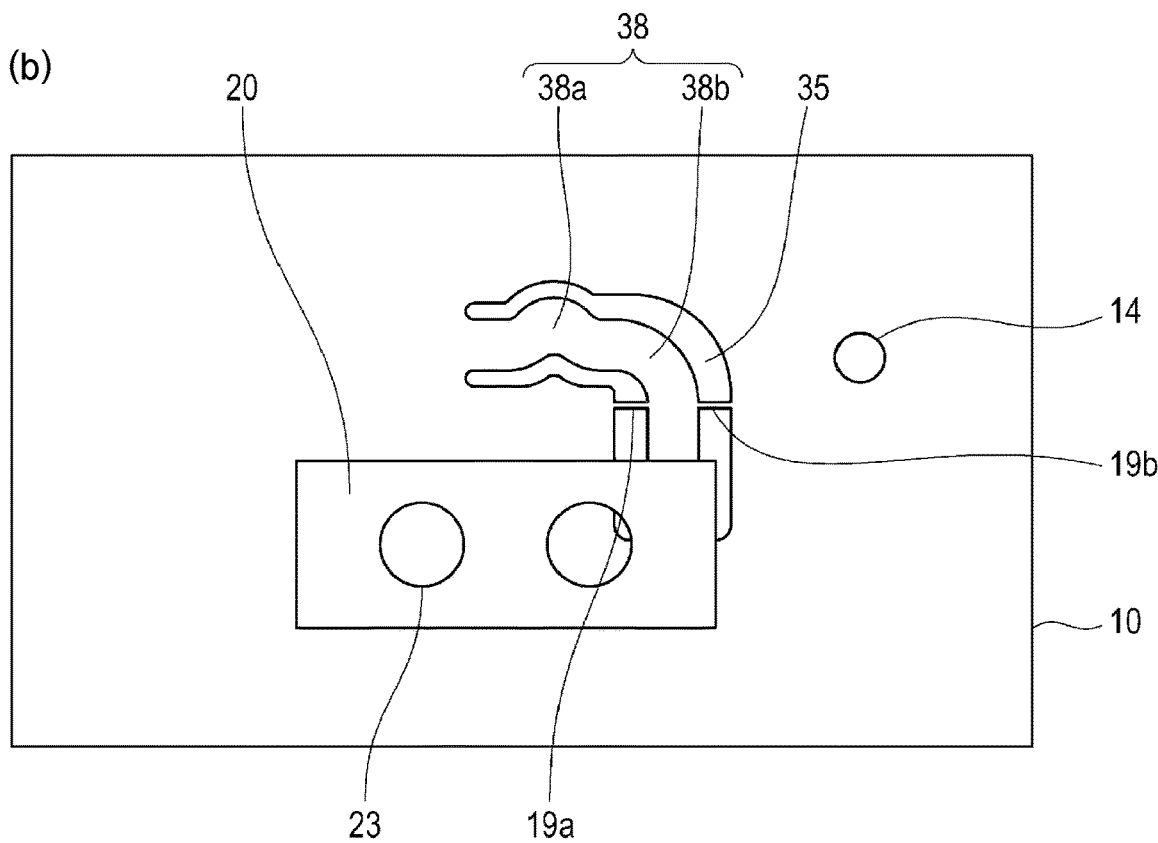

FIGS. 12(a) and 12(b) are diagrams for explaining a main part of the battery module of the fourth embodiment. FIG. 12(a) is a top view of the main body 68 of the battery module as viewed from above. FIG. 12(b) is a diagram illustrating a back surface of the main body 68 illustrated in FIG. 12(a). The battery module of the fourth embodiment is configured such that the flexible circuit board 10 covers the bus bar 20. The flexible circuit board 10 has insulating properties. Therefore, in the battery module of the fourth embodiment, it is necessary to form a contact hole in a portion of the connecting portion 38 that contacts the electrode 12 and to electrically connect the wiring 11 and the bus bar 20. Further, even if the wiring 11 is routed on the bus bar 20, the flexible circuit board 10 maintains insulation between the flexible circuit board 10 and the bus bar 20, and the battery module can be operated normally.

The battery modules of FIGS. 12(a) and 12(b) can increase the degree of freedom in routing the wiring 11. This facilitates layout and design of the circuit.

Figure 13:
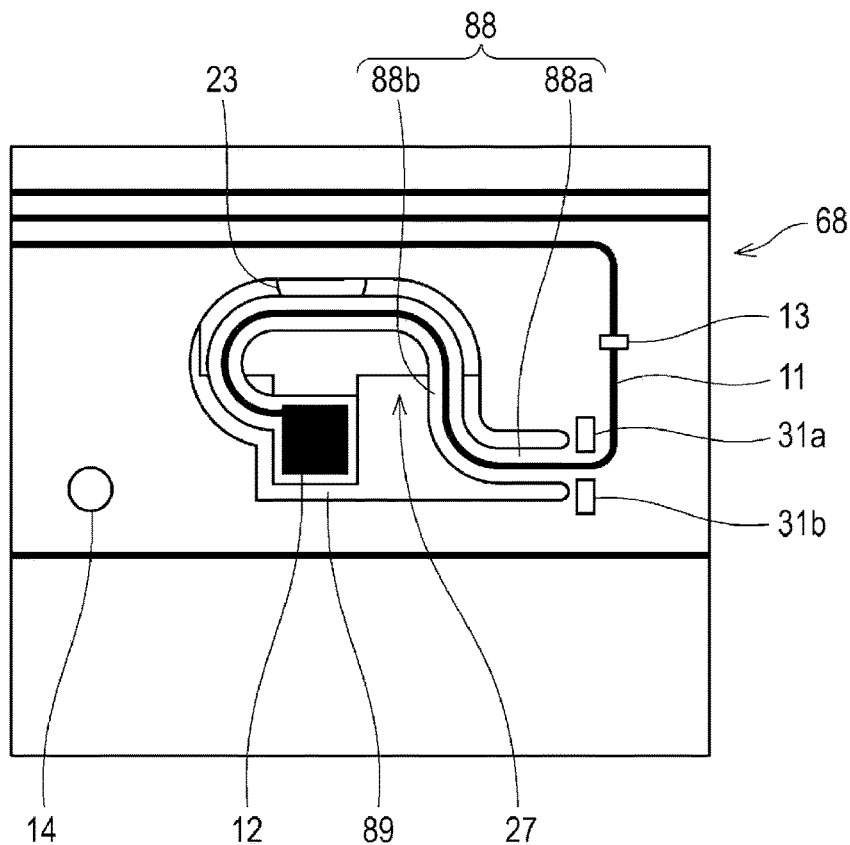
FIGS. 13(a) and 13(b) are both diagrams for explaining a modification of the fourth embodiment.
Figure 13:
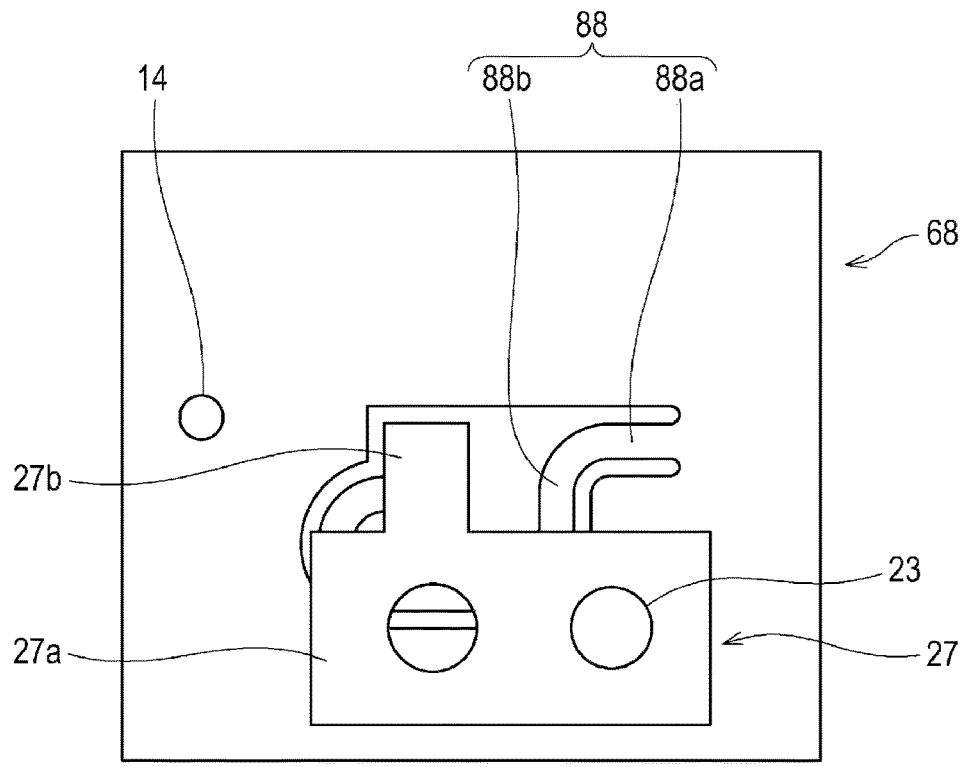

FIGS. 13(a) and 13(b) are diagrams for explaining a modification of the fourth embodiment. FIG. 13(a) is a top view of the main body 68 of the modification as viewed from above. FIG. 13(b) is a diagram illustrating the back surface of the main body 68 illustrated in FIG. 13(a). In the battery module illustrated in FIGS. 13(a) and 13(b), a bus bar 29 is used instead of the bus bar 20. The bus bar 29 is a bus bar in which a conductor portion exists further outside the hole 23 of the bus bar 20. In the fourth embodiment, by using the bus bar 29, the bus bar 29 can be covered with the flexible circuit board 10 and the electrode 12 can be connected to the bus bar 29 from two sides to detect an electric potential of the battery.

Further, in the fourth embodiment, also in the battery module illustrated in FIGS. 13(a) and 13(b), a connecting portion 88 includes a longitudinal extending portion 88a and a cross-extending portion 88b, and a slit 89 is formed on the entire circumference of the connecting portion 88.

The above embodiments include the following technical ideas.

(1) A wiring material which includes a flexible circuit board in which a plurality of batteries arranged in one direction is connected to one another via a bus bar and an arrangement direction of the batteries is a longitudinal direction of the flexible circuit board, the wiring material including: a narrow connecting portion connected to the bus bar; and a main body that is connected to the connecting portion and includes a portion wider than the connecting portion. The connecting portion has a longitudinal extending portion that projects from the main body in the longitudinal direction and extends in the longitudinal direction.

(2) The wiring material according to (1), in which the flexible circuit board has a plurality of the connecting portions, and has a circuit board unit including at least one of the connecting portions and at least one of main body portions separated corresponding to the connecting portions, and the longitudinal extending portion projects from the main body portion of the corresponding circuit board unit.

(3) The wiring material according to (2), in which the longitudinal extending portion is disposed in a corresponding circumscribed virtual region circumscribing the main body portion of the circuit board unit.

(4) The wiring material according to (3), in which the longitudinal extending portion is disposed to be included in the circumscribed virtual region.

(5) The wiring material according to any one of (1) to (4), further including a joint portion capable of breaking between the connecting portion and the main body with a force smaller than a force required to break the connecting portion.

(6) The wiring material according to any one of (1) to (5), in which the longitudinal extending portion has a meander shape that extends in the longitudinal direction and has irregularities in a direction intersecting the longitudinal direction.

(7) The wiring material according to any one of (1) to (6), in which the connecting portion has a cross-extending portion that extends from the longitudinal extending portion in a direction intersecting the longitudinal direction and is connected to the bus bar, and a length of the longitudinal extending portion is longer than the cross-extending portion.

(8) A battery module which includes a wiring material including a flexible circuit board in which a plurality of batteries arranged in one direction is connected to one another via a bus bar and an arrangement direction of the batteries is a longitudinal direction of the flexible circuit board, in which the wiring material includes: a narrow connecting portion connected to the bus bar; and a main body that is connected to the connecting portion and includes a portion wider than the connecting portion, and the connecting portion has a longitudinal extending portion that projects from the main body in the longitudinal direction and extends in the longitudinal direction, and the bus bar has a terminal engaging portion that engages with a terminal of the battery and a projecting end portion that extends from the terminal engaging portion toward the longitudinal extending portion.

(9) The battery module according to (8), in which the flexible circuit board covers the bus bar.

LIST OF REFERENCE SIGNS

1: Battery module, 3A to 3L: Battery, 7: Wiring material, 10: Flexible circuit board, 11: Wiring, 12: Electrode, 13: Fuse, 14: Alignment hole, 15, 35, 89: Slit, 18, 38: Connecting portion, 18a, 38a, 48, 58, 88a: Longitudinal extending portion, 18b, 38b, 88b: Cross-extending portion, 19a, 19b, 49: Joint portion, 20, 21, 27: Bus bar, 23: Hole, 25: Connector, 27a: Terminal engaging portion, 27b: Projecting end portion, 33: Terminal, 131a, 131b: Dummy pattern, 42: Welding plate, 68: Main body, 68a to 68k: Main body portion, 100: Cutout, 200: Circumscribed virtual region, e: End, P1 to P11: Circuit board unit.

The invention claimed is:
1. A wiring material including a flexible circuit board in which a plurality of batteries arranged in one direction is connected to one another via a bus bar and an arrangement direction of the plurality of batteries is a longitudinal direction of the flexible circuit board, comprising:
a narrow connecting portion connected to the bus bar;

a main body that is connected to the connecting portion and includes a portion wider than the connecting portion;

an electrode connected to the bus bar; and a wiring, a part of the wiring being formed so as to be connected to the electrode from the main body via the connecting portion, wherein the connecting portion has a longitudinal extending portion that projects from the main body in the longitudinal direction and extends in the longitudinal direction, the connecting portion has a cross-extending portion that extends from the longitudinal extending portion in a direction intersecting the longitudinal direction and is connected to the bus bar, a length of the longitudinal extending portion is longer than the cross-extending portion, and the part of the wiring is formed so as to be connected to the electrode from the main body via the longitudinal extending portion and the cross-extending portion.

2. The wiring material according to claim 1, wherein the flexible circuit board has a plurality of connecting portions, and has a circuit board unit including at least one of the plurality of connecting portions and at least one of main body portions separated corresponding to the plurality of connecting portions, and the longitudinal extending portion projects from the main body portion of the corresponding circuit board unit.

3. The wiring material according to claim 2, wherein the longitudinal extending portion is disposed in a corresponding circumscribed virtual region circumscribing the main body portion of the circuit board unit.

4. The wiring material according to claim 3, wherein the longitudinal extending portion is disposed to be included in the corresponding circumscribed virtual region.

5. The wiring material according to claim 1, further comprising a joint portion capable of breaking between the connecting portion and the main body with a force smaller than a force required to break the connecting portion.

6. The wiring material according to claim 1, wherein the longitudinal extending portion has a meander shape that extends in the longitudinal direction and has irregularities in a direction intersecting the longitudinal direction.

7. A battery module comprising a wiring material including a flexible circuit board in which a plurality of batteries arranged in one direction is connected to one another via a bus bar and an arrangement direction of the plurality of batteries is a longitudinal direction of the flexible circuit board, wherein the wiring material comprises: a narrow connecting portion connected to the bus bar; and a main body that is connected to the connecting portion and includes a portion wider than the connecting portion, and the connecting portion has a longitudinal extending portion that projects from the main body in the longitudinal direction and extends in the longitudinal direction, the longitudinal extending portion comprises an end extending in the longitudinal direction and surrounded by portions of the flexible circuit board, and the bus bar has a terminal engaging portion that engages with a terminal of a battery of the plurality of batteries and a projecting end portion that extends from the terminal engaging portion toward the longitudinal extending portion.

8. The battery module according to claim 7, wherein the flexible circuit board covers the bus bar.

* * * * *